(12) United States Patent
Yu et al.

(10) Patent No.: US 7,752,148 B2
(45) Date of Patent: Jul. 6, 2010

(54) MATH PROBLEM CHECKER

(75) Inventors: Jinsong Yu, Sammamish, WA (US);
Seth R. Atkinson, Seattle, WA (US);
Luke Kelly, Bellevue, WA (US);
William B. Kunz, Seattle, WA (US);
Larry J. Israel, Bellevue, WA (US); Xin Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 565 days.

(21) Appl. No.: 11/776,565

(22) Filed: Jul. 12, 2007

(65) Prior Publication Data

US 2009/0018979 A1 Jan. 15, 2009

(51) Int. Cl.
*G06F 15/18* (2006.01)
*G06F 3/048* (2006.01)
*G09B 23/02* (2006.01)

(52) U.S. Cl. .................. 706/12; 434/188; 715/810
(58) Field of Classification Search .............. 706/21
See application file for complete search history.

(56) References Cited

U.S. PATENT DOCUMENTS

| 5,189,633 | A | | 2/1993 | Bonadio | |
|---|---|---|---|---|---|
| 5,469,538 | A | | 11/1995 | Razdow | |
| 5,827,066 | A | | 10/1998 | Henter | |
| 5,870,731 | A | * | 2/1999 | Trif et al. | 706/52 |
| 6,101,490 | A | * | 8/2000 | Hatton | 706/55 |
| 6,173,276 | B1 | * | 1/2001 | Kant et al. | 706/50 |
| 6,269,356 | B1 | * | 7/2001 | Hatton | 706/55 |
| 6,771,252 | B2 | | 8/2004 | Miller et al. | |
| 6,772,136 | B2 | * | 8/2004 | Kant et al. | 706/50 |
| 6,922,710 | B2 | | 7/2005 | Child et al. | |
| 6,990,519 | B2 | | 1/2006 | Fortenberry et al. | |
| 7,155,157 | B2 | * | 12/2006 | Kaplan | 434/350 |
| 2003/0041078 | A1 | | 2/2003 | Child et al. | |
| 2004/0191746 | A1 | | 9/2004 | Maron et al. | |
| 2005/0058976 | A1 | | 3/2005 | Vernon | |
| 2006/0024649 | A1 | | 2/2006 | Vernon | |

OTHER PUBLICATIONS

Unit Testing: Static Analysis and Dynamic Analysis, Na Zhang; Xiaoan Bao; Zuohua Ding; Computer Sciences and Convergence Information Technology, 2009. ICCIT '09. Fourth International Conference on Digital Object Identifier: 10.1109/ICCIT.2009.106 Publication Year: 2009 , pp. 232-237.*

(Continued)

*Primary Examiner*—Michael Holmes

(57) ABSTRACT

A problem checker architecture that monitors user progress during a problem-solving process and assists the user through the process (e.g., when requested) using common human methods of solving the problem. Assistance can be in the form of detecting errors during the process, and providing context-sensitive help information when the user gets stuck or makes a mistake. The problem checker can walk the user through the process of solving a math problem one step at a time allowing the user to learn to solve math problems according to a number of different methods. Rather than simply calculating and displaying the answer, the problem checker allows the user to attempt to solve math problems, providing direction only when asked and correction only when required. The problem checker can recognize multiple solution methods for many common math problems and guide the user to the solution via any of the methods.

20 Claims, 18 Drawing Sheets

OTHER PUBLICATIONS

Fast on-the-fly parametric real-time model checking, Dezhuang Zhang; Cleaveland, R.; Real-Time Systems Symposium, 2005. RTSS 2005. 26th IEEE International Digital Object Identifier: 10.1109/RTSS.2005.22 Publication Year: 2005 , pp. 10 pp.-166.*

Tran, "Interactive Computer Algebra Software for Teaching and Helping Students to Study Foundations of Computer Science", vol. 22, Issue 1, 2006, Consortium for Computing Sciences in Colleges, pp. 131-143.

Koedinger, et al., "Intelligent Tutoring Goes to School in the Big City ", Aug. 16-19, 1995, pp. 30-43.

Hall, et al., "The Use of Computer Algebra Systems in Initial Teacher Education", No. 7, Jun. 1995, pp. 8.

* cited by examiner

MATH PROBLEM CHECKER

BACKGROUND

The rapid evolution of hardware and software has provided many benefits in the areas of research, business systems, and learning. In an academic environment, for example, students and teachers are now required to use computers to some extent for assignments, examinations, presentations, etc. The technical arts such as mathematics, physics and chemistry typically pose a significant challenge to students who need to learn one or more of these subjects as a foundation for graduation.

The generation and review of problem solutions is a fundamental tenet to providing educational value to students. In the context of mathematics, for example, the ability to review the solutions to problems in a step-by-step manner not only improves understanding by the student, but can also expose flaws in the student's reasoning process which can be critical as the problems and problem solutions become more complex.

Computer algebra systems (including computer algebra software, graphing calculator software, and handheld graphing calculators) can generally perform mathematical calculations and solve equations, and display the final results. In order to be educationally valuable, computer algebra systems need to help students learn, and in particular, to find the solutions to math problems. Existing computer algebra systems usually provide the solution to a math problem immediately and without insight into how to arrive at the solution. Moreover, computer algebra systems use solution methods that depart from methods that a user would normally employ. These and other limitations reduce the effectiveness, and thus, the educational value of existing computer algebra systems.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Disclosed is a problem checker architecture that addresses conventional limitations by monitoring user progress during a problem-solving process and assisting the user through the process (e.g., when requested) using common human methods of solving the problem. Assistance can be in the form of detecting errors during the process, and providing context-sensitive help information when the user gets stuck or makes a mistake.

The problem checker can walk the user through the process of solving a math problem one step at a time allowing the user to learn to solve the math problem according to a number of different methods. Rather than simply calculating and displaying the answer, the problem checker allows the user to attempt to solve the math problem, providing direction only when asked and correction only when required. The problem checker can recognize multiple solution methods for many common math problems and guide the user to the solution via any of the methods.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
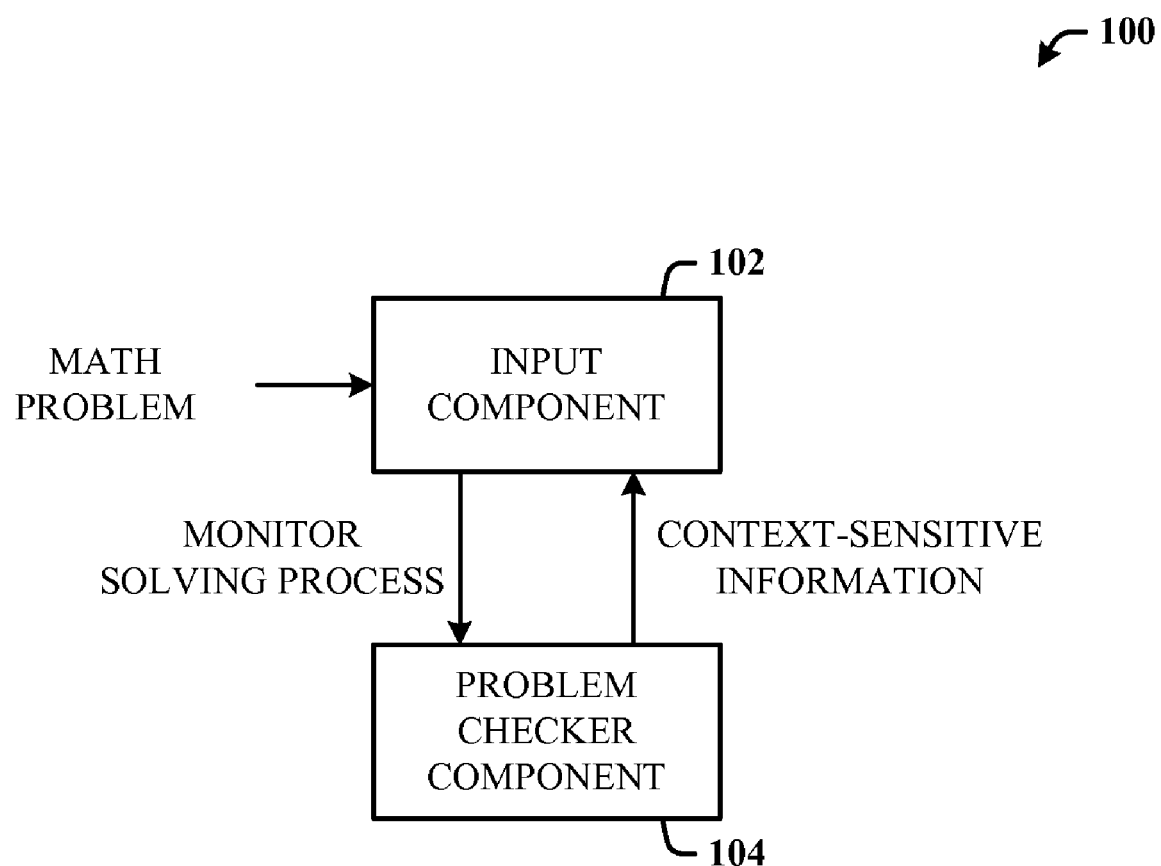
FIG. 1 illustrates a computer-implemented problem checking system.

The disclosed architecture includes a problem checker in a computer algebra system that can walk a user through the process of solving a math problem, detect errors, and provide context-sensitive corrections and hints at some or all of the problem-solving steps. A user interface allows the user to work through a problem and displays hints and corrections where appropriate.

In one example, a student needs to learn more about solving inequalities in an algebra class. Using a tutor application that embodies the disclosed problem checker, the student chooses to practice working similar types of problems. By entering $-3(2x-7)>-5$ and choosing to receive step-by-step help, the student will receive hints and text advising how to begin. This can include simplifying the left side of the inequality according to the order of operations. The phrase "order of operations" can be hot-linked to a definitional source so that the student can obtain a quick definition.

Still not quite sure how to proceed, the student can make a selection to receive a second hint, which suggests using the distributive property to simplify the problem and links to a definition of the distributive property. Working through the process, the student inadvertently enters the next step as −6x−21>−5. The problem checker generates and presents a pop-up arithmetic error alert, pointing out that a sign error was made in the step. After correcting the sign from −21 to +21, the student moves through the remaining steps of the solution without requesting additional hints or making any additional errors. Upon completing the problem, the student chooses additional practice at inequalities by selecting the appropriate UI option which provides a similar practice problem type such as 6(−3x+4)<−12, created by a problem generator. The problem checker can then analyze this problem, generate possible methods for solving, and provide assistance as requested to work through this new problem.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented problem checking system 100. The system 100 includes an input component 102 for receiving a math problem to be worked via a solving process, and a problem checker 104 for monitoring the process and generating context-sensitive information as part of the solving process. The context-sensitive information can include hints information, correction information, and/or a solution generated in response to a user action during the solving process. The user action can include directly requesting hints or automatically receiving correction information due to an incorrect action when working through the problem. The problem checker 104 presents or facilitates presentation of the context-sensitive information (via the input component 102) based on a request by the user.

The problem checker 104 computes multiple possible solutions to solving the math problem. Thus, no matter which way the user works through the problem, the generator 104 will have processed or accessed hints information in anticipation of possible actions by the user. As will be described below, a default library of problem solutions can be provided and/or machine learning can be employed to anticipate user faults based on previous user problem solving exercises, for example. This capability also facilitates caching of this information for faster execution.

Figure 2:
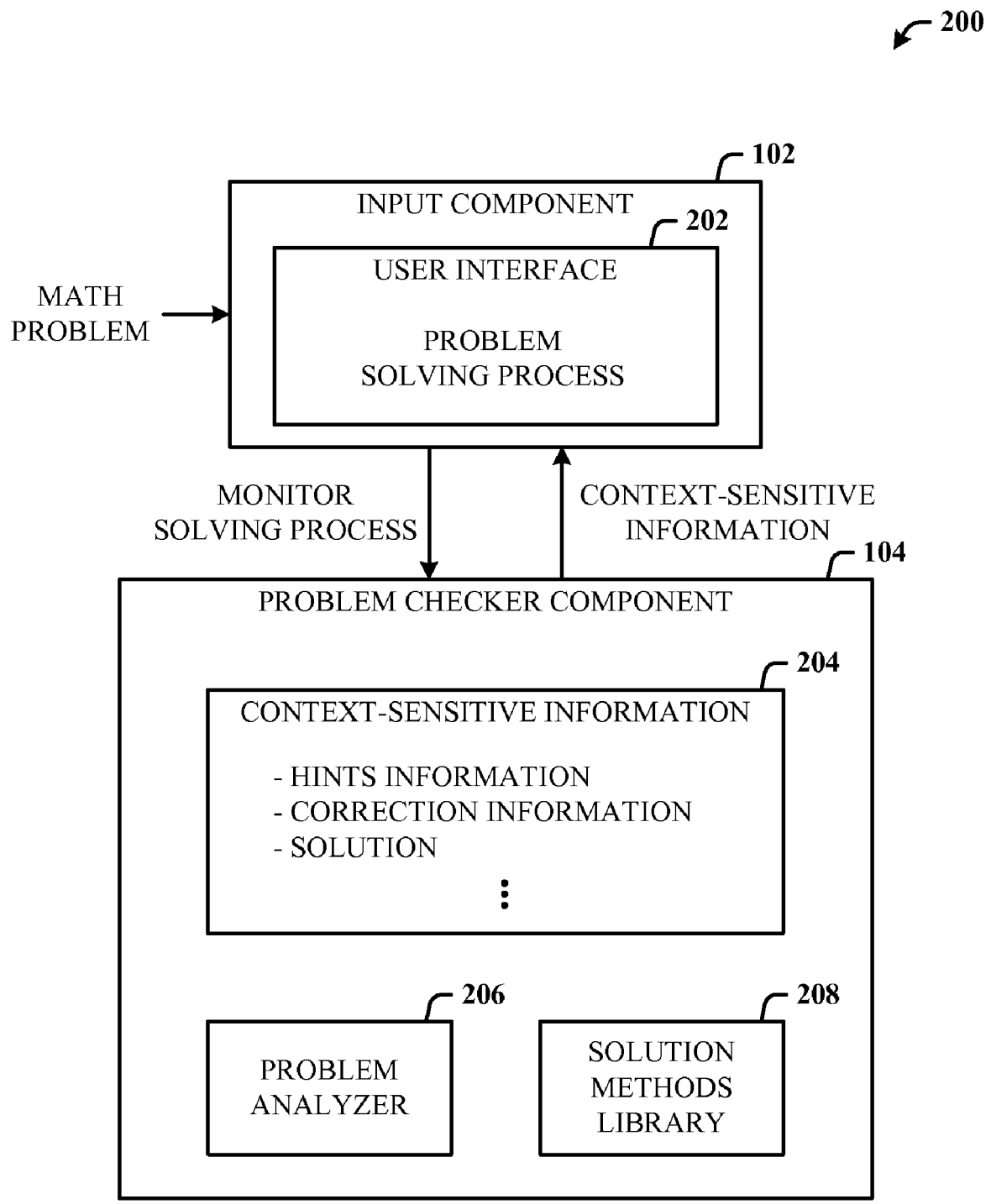
FIG. 2 illustrates a more detailed system for problem checking.

FIG. 2 illustrates a more detailed system 200 for problem checking. The input component 102 includes a user interface (UI) 202 into which a user can enter the math problem for the solving process. The UI 202 can include options for user selection of behaviors such as automatically presenting hints, corrections, next step solutions, and so on. The UI 202 can further present definitional information related to the type of problem, aspects for solving the problem, problem statements, and so on.

The problem checker component 104 can further include the context-sensitive information 204 which comprises the hints information, correction information and solution information. The solution information can include interim step solutions and/or the final solution to the problem. A problem analyzer 206 analyzes the input problem for structure or common expression format in order to obtain one or more possible methods for solving the problem from a solution methods library 208. The library (or datasource) 208 can be provided as a default library for the system 200, but updated from a remote source, for example. In one embodiment, the checker 104 receives and caches all possible solution methods (and steps) for working through the problem. In an alternative implementation, the checker 104 retrieves and represents the methods dynamically based on the particular context of the problem in which the user is working on.

Figure 3:
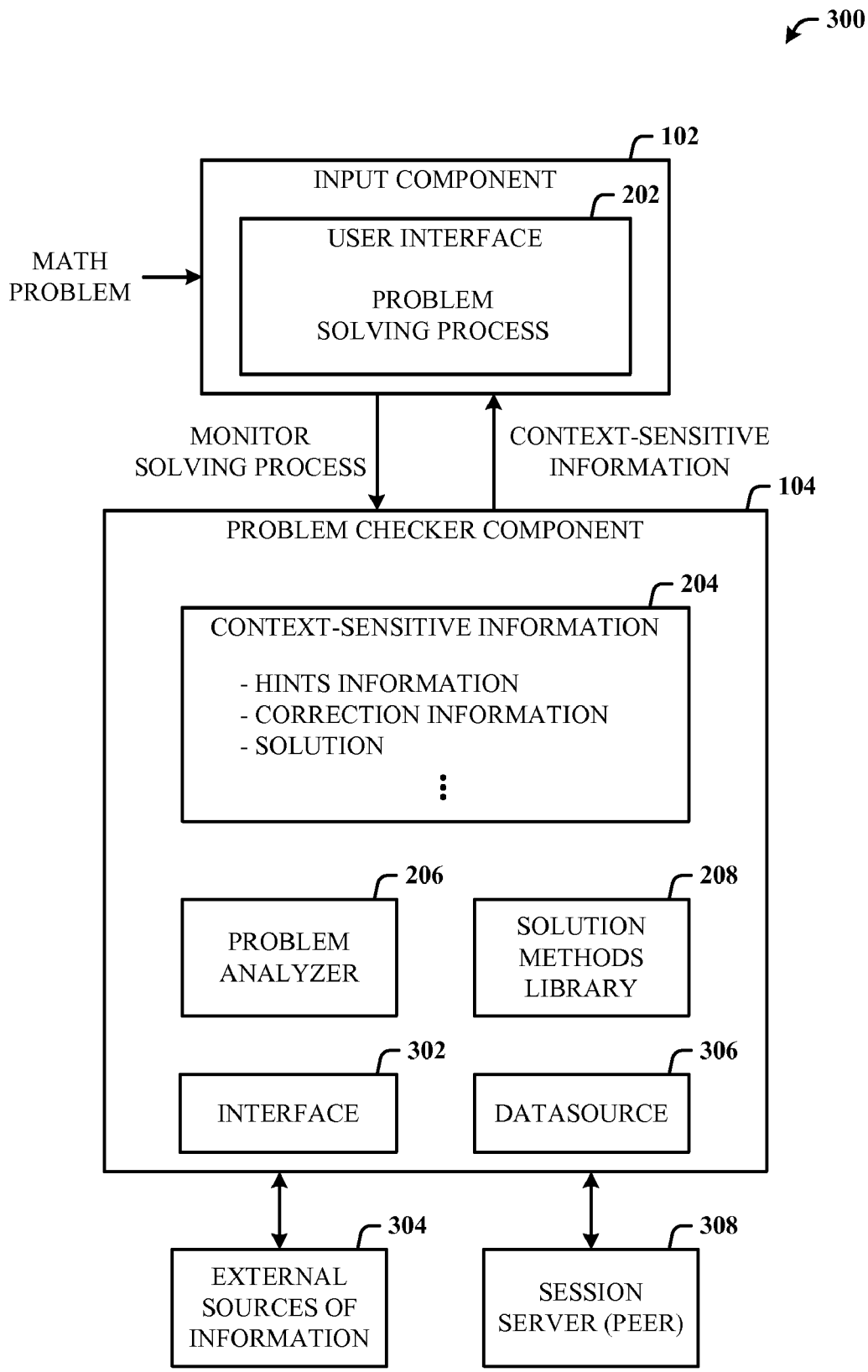
FIG. 3 illustrates an alternative system that allows external access to other information in support of problem checking.

FIG. 3 illustrates an alternative system 300 that allows external access to other information in support of problem checking. The system 300 includes the system 200, the components and functionality of which are described above. Additionally, the problem checker 104 includes an interface 302 for accessing and communicating to external sources of information 304. For example, when a user is working through a problem, the checker 104 can respond to user requests for additional information that may not be available in a default internal information datasource 306 shipped with the distribution. The external sources 304 can be websites approved as sources of information in a learning environment. The external sources 304 can also include a site (public or private) that provides updates to the internal datasource 306.

The interface 302 can also facilitate network access to a session server 308 that can monitor user progress such as could be associated with an examination phase being overseen remotely via the session. In a peer-to-peer relationship, the interface 302 can facilitate peer users working together on single problem, for example. These are only but a few examples of the flexibility that can be provided.

Figure 4:
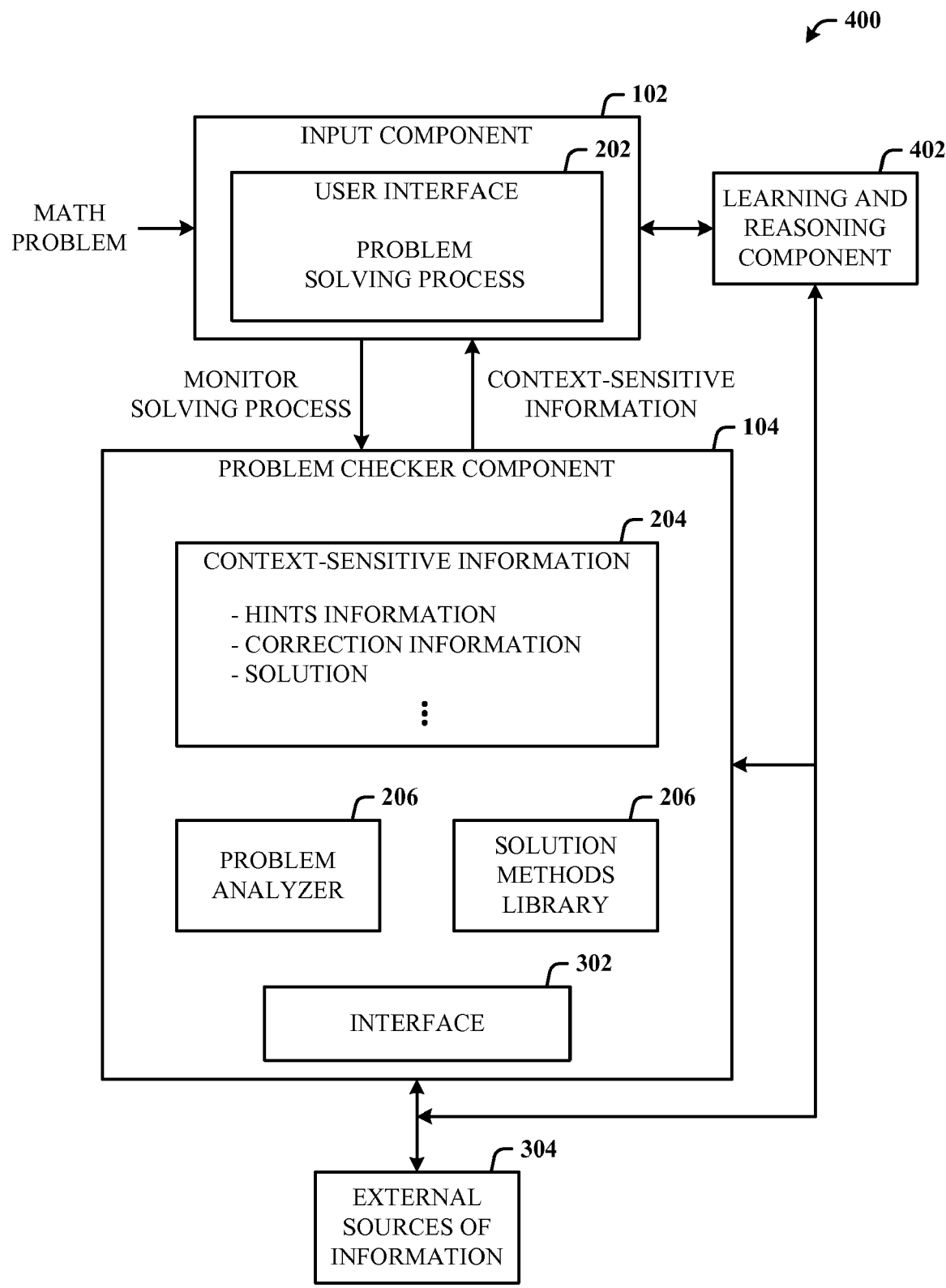
FIG. 4 illustrates a problem checking system that employs machine learning and reasoning component which facilitates automating one or more features.

FIG. 4 illustrates a problem checking system 400 that employs machine learning and reasoning (MLR) component 402 which facilitates automating one or more features. The subject architecture (e.g., in connection with selection) can employ various MLR-based schemes for carrying out various aspects thereof. For example, a process for determining problem complexity relative to the user and adjusting the method for soling from the many possible methods can be facilitated via an automatic classifier system and process.

A classifier is a function that maps an input attribute vector, $x=(x_1, x_2, x_3, x_4, \ldots, x_n)$, where n is a positive integer), to a class label class(x). The classifier can also output a confidence that the input belongs to a class, that is, $f(x)=confidence$ (class(x)). Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, various forms of statistical regression, naïve Bayes, Bayesian networks, decision trees, neural networks, fuzzy logic models, and other statistical classification models representing different patterns of independence can be employed. Classification as used herein also is inclusive of methods used to assign rank and/or priority.

As will be readily appreciated from the subject specification, the subject architecture can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

In one example, the MLR component 402 can monitor user progress via the checker 104 and/or via the input component 102. Based on user interaction in attempting to solve a problem, the number of hints presented, the number of corrections presented, etc., the MLR component 402 can influence a more difficult method to take for solving or a less difficult method to take for solving the problem. Information learned during this monitoring process can be stored as a user profile or an update to an existing profile on the local client and/or a server-based implementation.

Figure 5:
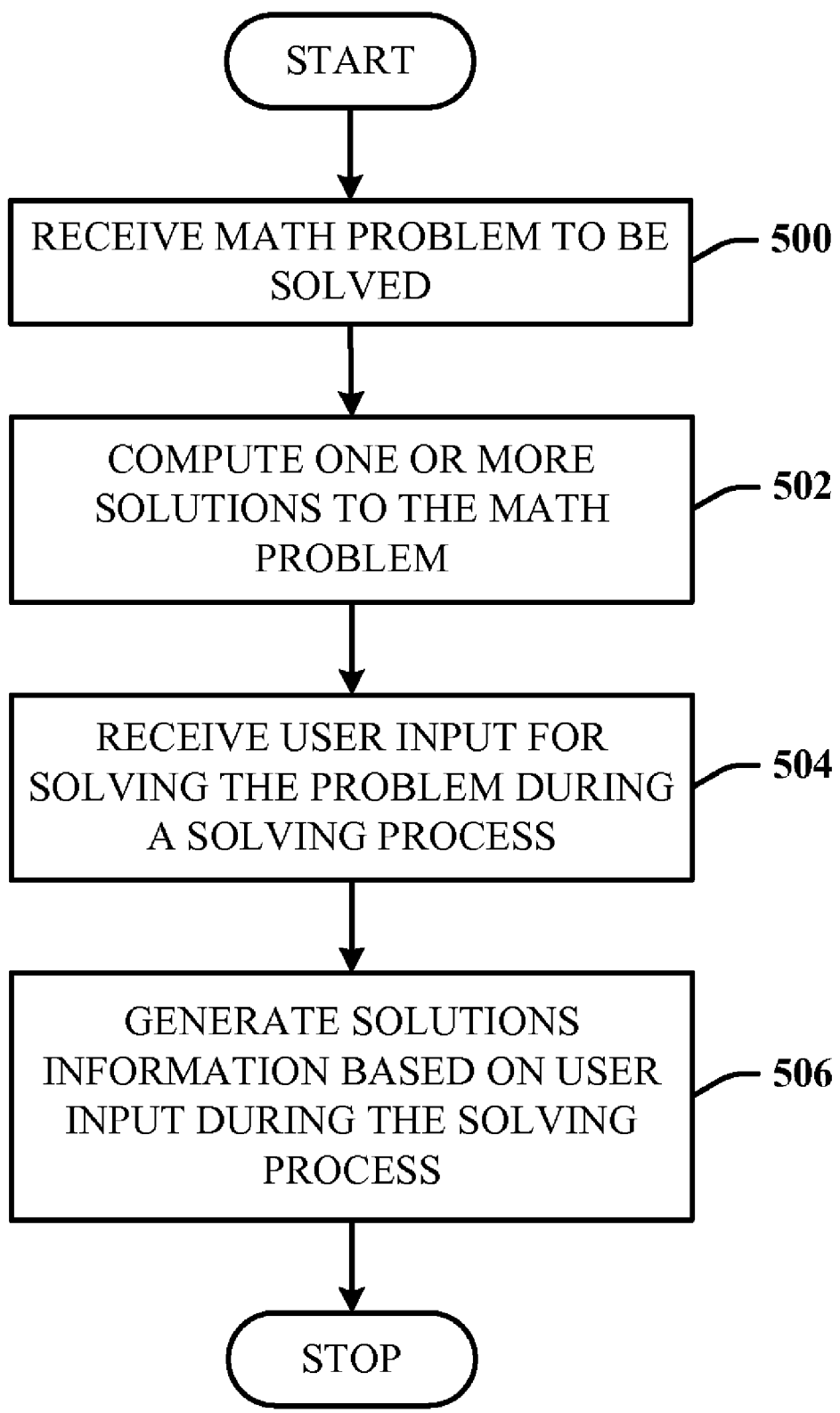
FIG. 5 illustrates a computer-implemented problem checking method.

FIG. 5 illustrates a computer-implemented problem checking method. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 500, a math problem to be solved is received. This can be by direct user input of the problem into a workspace and/or automatic input from another program (e.g., a secured teacher template for exam purposes). At 502, one or more solutions to the problem are computed. This can be a background process that computes all possible user inputs based a library of solution methods local to the user client and/or remote therefrom. At 504, user input for solving the problem is received during a solving process. In other words, the user operates on the math problem that was input by beginning to work through the problem in various steps. At 506, based on the user input at various stages of the solving process, solutions information can be generated. The user is then presented with an option to view the solutions information or have the information presented automatically.

Figure 6:
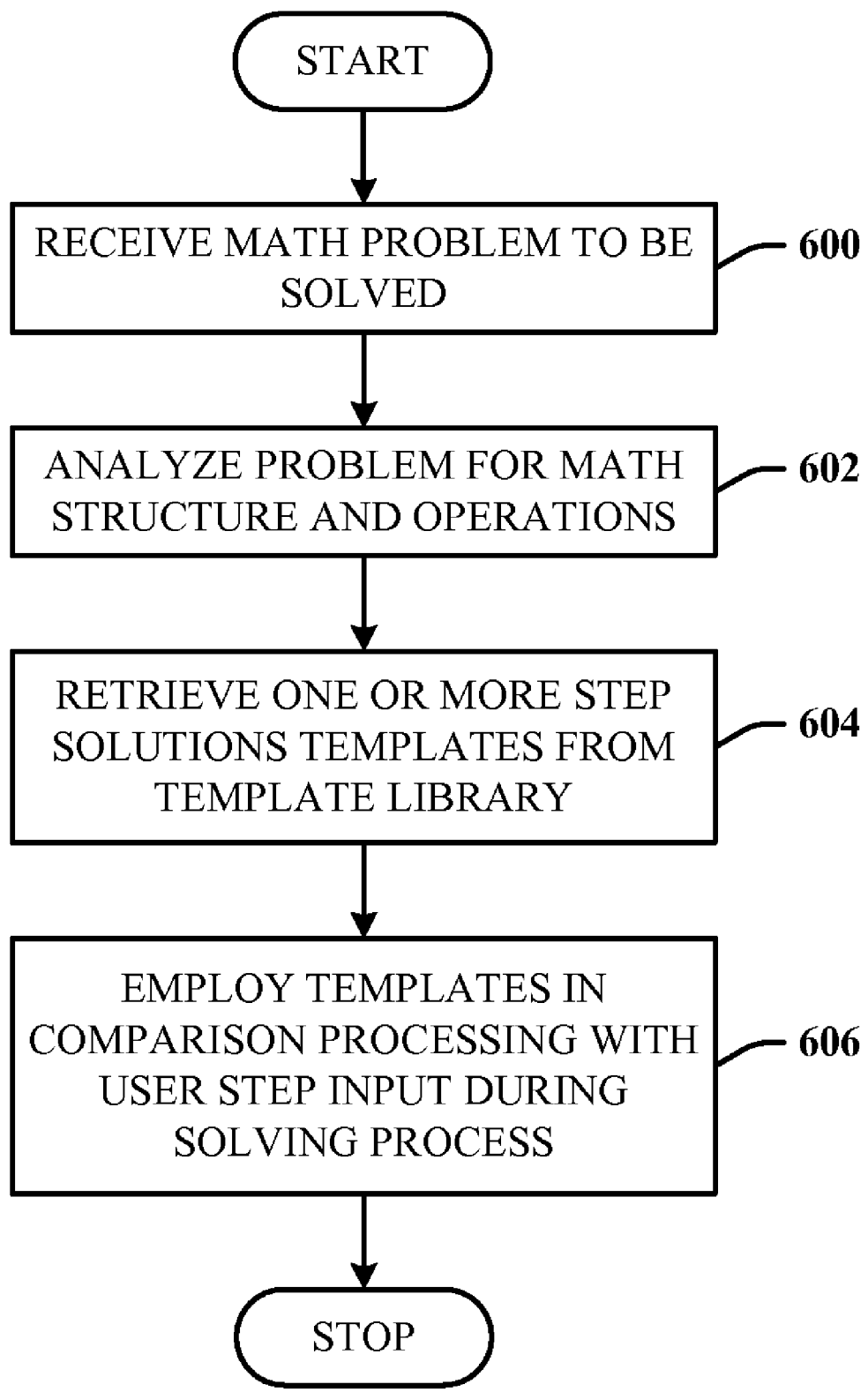
FIG. 6 illustrates a method of preparing for math problem processing in a problem checking algorithm.

FIG. 6 illustrates a method of preparing for math problem processing in a problem checking algorithm. At 600, a math problem is received. At 602, the problem is analyzed for math structure and math operations. At 604, one or more predefined solutions templates are retrieved from a template library. At 606, the templates are used in a comparison process with user step input during the solving process. Note that in one embodiment all templates can be retrieved for all possible solutions steps for the math problem. In an alternative embodiment, template selection and processing occurs dynamically for each step of the user input. In any case, the templates and related data can be cached for faster processing.

Figure 7:
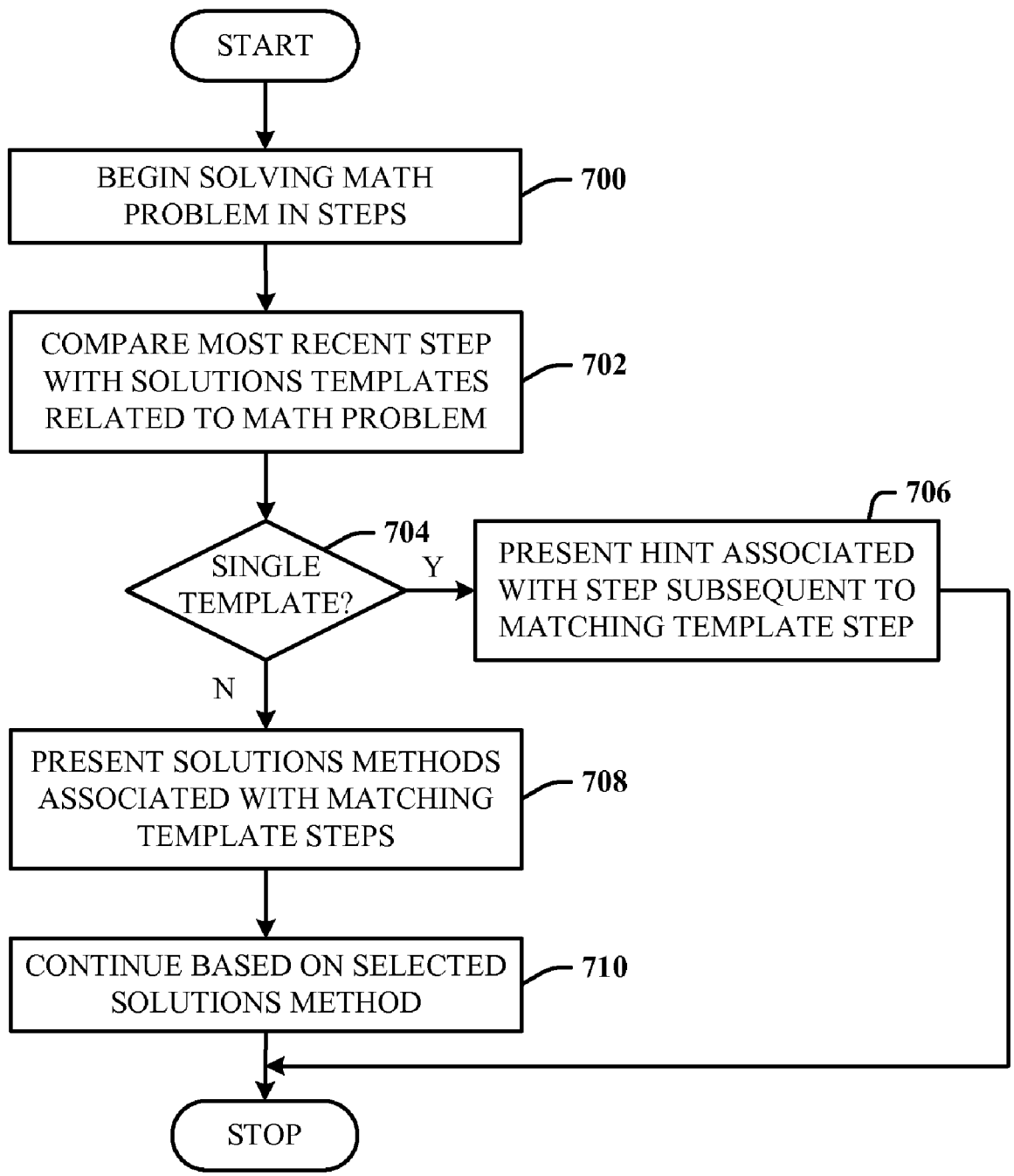
FIG. 7 illustrates a method of providing hints information in a math problem checking algorithm.

FIG. 7 illustrates a method of providing hints information in a math problem checking algorithm. At 700, the user begins solving a math problem in steps. At 702, the most recently entered step is compared with solutions templates obtained for this math problem. At 704, if there is only one matching template, flow is to 706 where the hint associated with a step subsequent to the matching template step is presented. Alternatively, if there are multiple matching templates, flow is from 704 to 708 where the solution methods for the matching templates are presented for selection of one of the methods. At 710, the solving process continues based on the selected method.

Figure 8A:
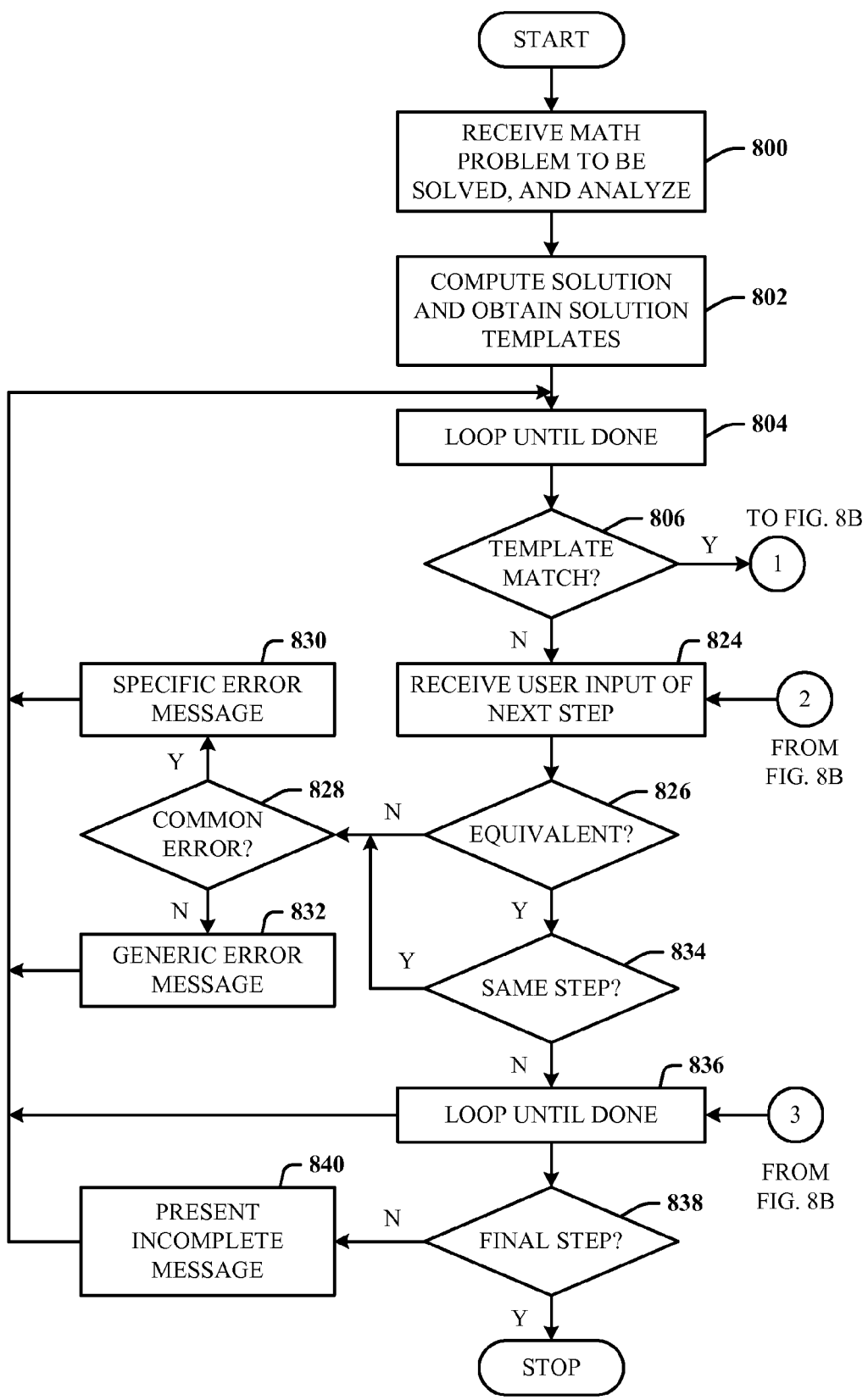
FIGS. 8A and 8B illustrate a method of progressively moving a user forward through a math solving process.
Figure 8B:
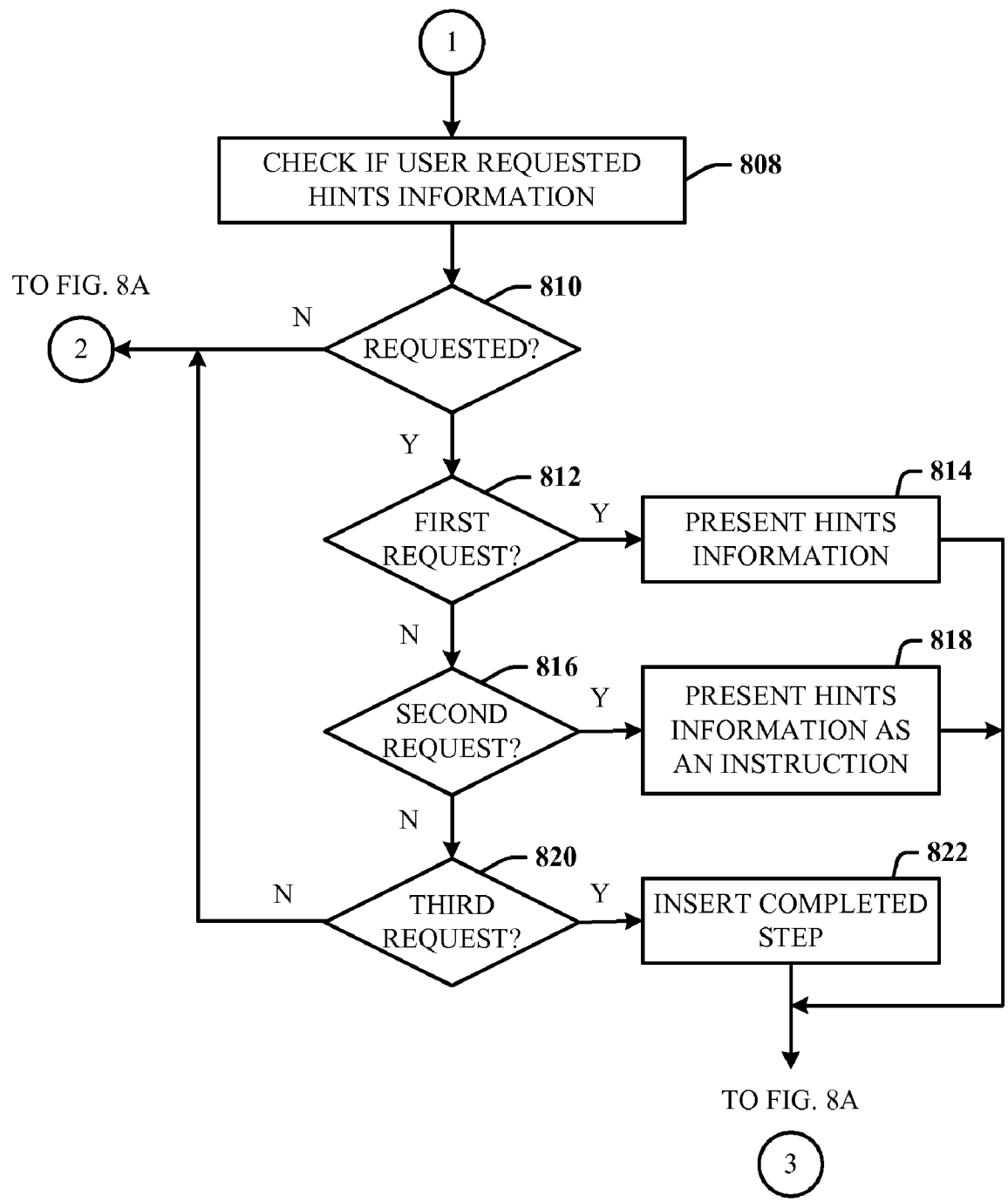

FIGS. 8A and 8B illustrate a method of progressively moving a user forward through a math solving process. At 800, a math problem to be solved is received and analyzed. The math symbols can be entered using math symbol buttons from the UI. Consider, as an example that the math problem input is $x+\sqrt{x}-5=1$. At 802, the system computes a solution and obtains associated solution templates. For example, a math engine computes the problem solution or solutions as $x=4$.

At 804, the process loops until done. Here, the process continues to offer the entry of an additional step until the user indicates that no additional user activity will be provided (e.g., the problem has been completed). At 806, the algorithm checks for a template match. For example, $x+\sqrt{x}-5=1$ matches a general solutions step-by-step template of $ax+\sqrt{bx}+c=d$. If at least one step-by-step solution template is matched, flow is to ① of FIG. 8B where at 808, a check is made if the user has requested hints information. If not, at 810, flow is back to ② of FIG. 8A. If so, at 810, flow is to 812 to determine if this is a first request. If a first request, flow is from 812 to 814 where context-sensitive hints information is presented. For example: "General strategy: Isolate the square root term on one side of the equals sign and square both sides". The key concept of isolating terms can be provided as a hotlink (represented as underlined Isolate) to a glossary definition. Flow is then back to ③ of FIG. 8A.

If not a first request for hints information, flow is from 812 to 816, where the algorithm checks for user progress (e.g., the user has not advanced a step in the solving process) based on a second request for hints information. If a second request, flow is from 816 to 818 where if the problem matches an existing step-by-step solutions template, a specific instruction concerning the next step in the problem's solution can be presented (e.g., displayed, played as an audio file), for example: "Add 5 to both sides of the equation". The key concept of addition can be provided as a hotlink (represented as underlined Add) to a glossary definition. Flow is then back to ③ of FIG. 8A.

If not a second request, flow is from 816 to 820 where the algorithm checks for user progress (e.g., the user has not advanced a step in the solving process) based on a third request for hints information. If a third request has been requested, flow is from 820 to 822 to automatically insert the complete step for the user, for example, $x+\sqrt{x}=6$. Flow is then back to ③ of FIG. 8A. If not a third request, an error message can be passed, and flow is back to ② of FIG. 8A.

Continuing with FIG. 8A, the user enters the next step in the problem's solution, as indicated at 824. Math symbols can be entered using math symbol buttons from the UI. For example, the user can enter $\sqrt{x}=x+6$, having a sign error when moving x from the left side to the right side of the equation. At

826, the algorithm checks for mathematical equivalence. The math engine compares the entered step with a problem statement, and with each solution, checks for mathematical equivalence. For example, $\sqrt{x}=x+6$ is not equivalent to $x+\sqrt{x}=5=1$.

If there is equivalency, flow is from 826 to 828 to process an error message. In other words, if the entered step is not mathematically equivalent, a check is made to determine if the change between this step and the previous step matches a common error template, for example, a change from $x+\sqrt{x}=6$ to $\sqrt{x}=x+6$ matches a common error template. One example of a common error template is a sign error where the user should have changed x to −x when moving it across the equal sign. If a specific message, flow is from 828 to at 830, where a specific message is presented for the matched error and the user is encouraged to correct the step. One example of a message is "The program believes you made a sign error on this step. Try correcting it and click Enter again." Alternatively, if not a common error, flow is from 828 to 832 to generate and present a generic error message. For example: "The program tutor believes you made an error in this step. Try correcting the error and click Enter again." In either case, after the messages are presented, flow is from 830 or 832 back to 804 to continue looping until the process is done.

At 834, a check is made to determine if the steps are the same. This is a check to make sure the user has not circled back to a previous step. If equivalent, flow is from 834 to 828 to process error messages. If the same step is not detected at 834, flow is to 836 to continue looping back to 804 until the process is done. The algorithm continues to offer the entry of an additional step until the user indicates that the user is done with the problem.

When the process has completed for the step, flow is from 836 to 838 to check if the step is the final step. For example, if the user clicks indicates done, the algorithm checks if the final step is identical to the solution or solutions calculated earlier by the math engine. For example, the user enters x=4 and clicks Done, and the calculated solution is x=4. The order of multiple solutions will not matter.

If the final step is not identical to the calculated solution, flow is from 838 to 840 to present a message indicating the solution is incomplete, and return back to 804 to continue looping. For math problems with more than one solution, it is a common error to stop after finding a single solution. For example, $x^2+3x+2=0$ has two solutions. The user may find one solution, but need to continue the problem and find the other solution. This step will point out that error. However, if the loop has completed for this step, flow ends.

At this point, the user can enter another math problem, or be presented with similar problems, the description of which is the subject of another patent application.

Figure 9:
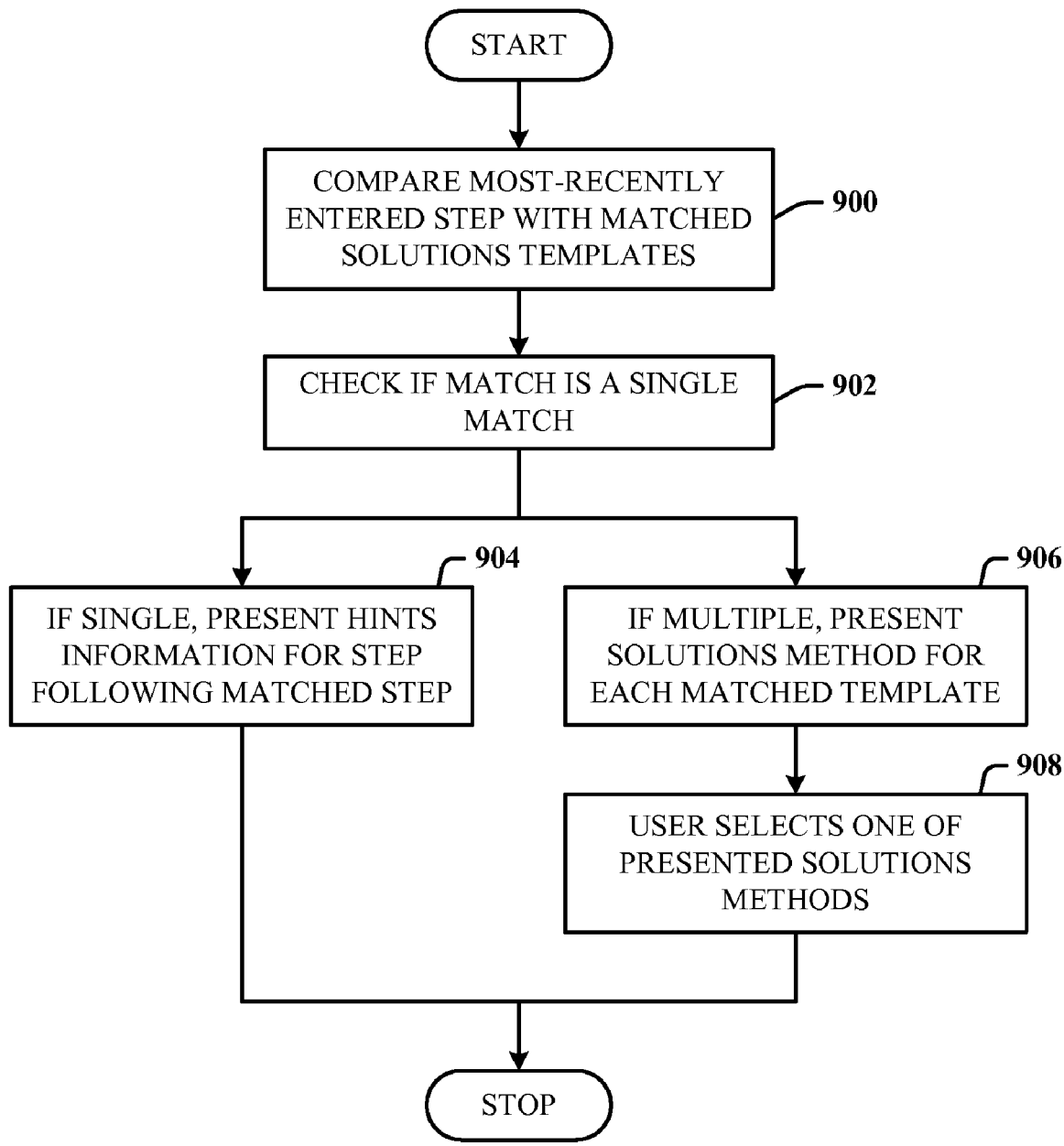
FIG. 9 illustrates a method of processing a first hint request.

FIG. 9 illustrates a method of processing a first hint request. At 900, a most-recently entered step is compared with steps from all matched solutions templates (e.g., step-by-step templates). At 902, a check is made to determine if the match is only a single template. If so, at 904, a hint string for the step following the matched step is presented. If not, steps for multiple templates are matched, and the solution method for each matched template is presented, as indicated at 906. At 908, the user can then select one of the methods from which to proceed in the solving process.

Figure 10:
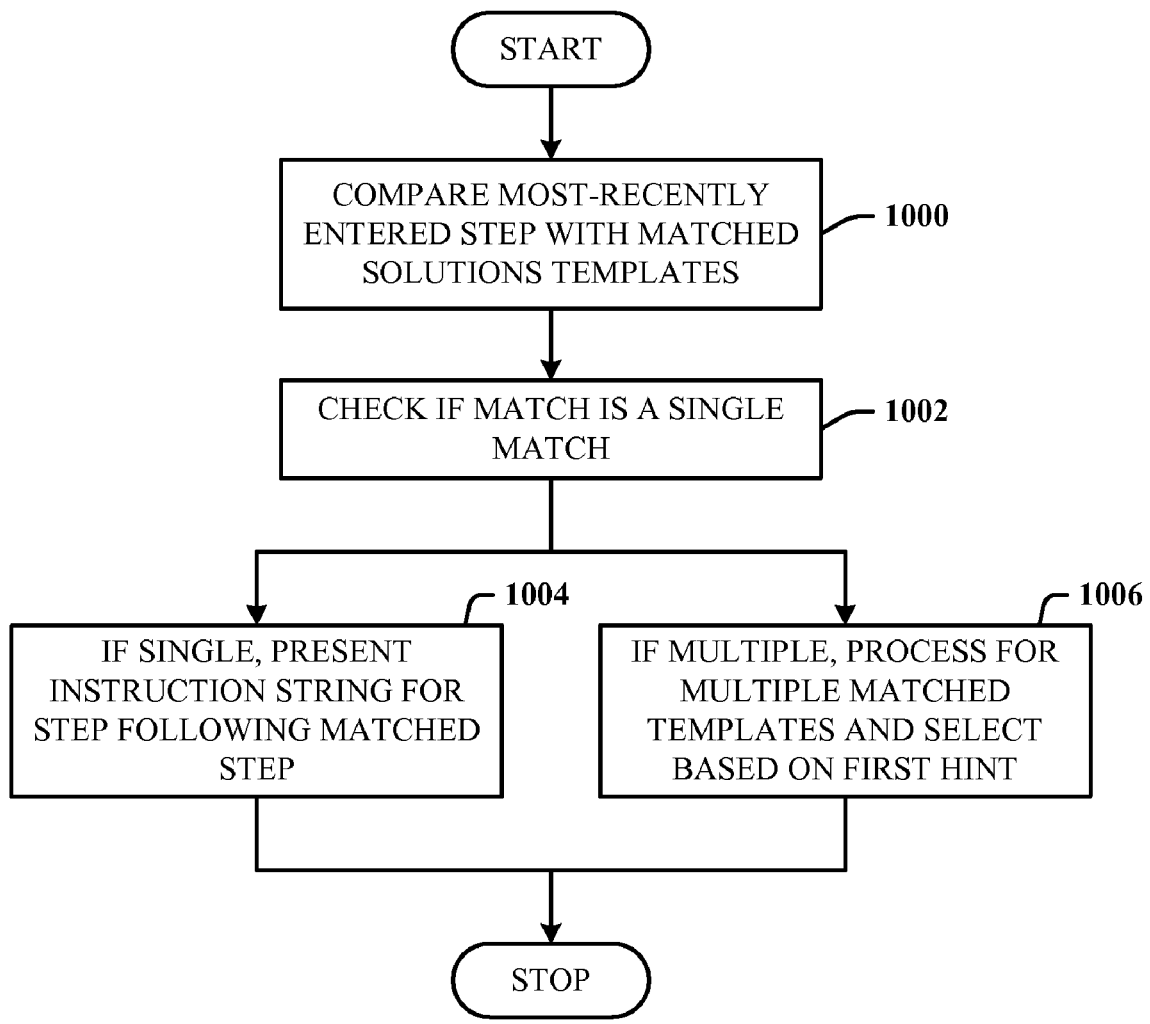
FIG. 10 illustrates a method of processing a second hint request.

FIG. 10 illustrates a method of processing a second hint request. At 1000, a most-recently entered step is compared with steps from all matched solutions templates (e.g., step-by-step templates). At 1002, a check is made to determine if the match is only a single template. If so, at 1004, an instruction string for the step following the matched step is pre-sented. If not, steps for multiple templates are matched, and the solution method chosen is based on the first hint used, as indicated at 1006.

Figure 11:
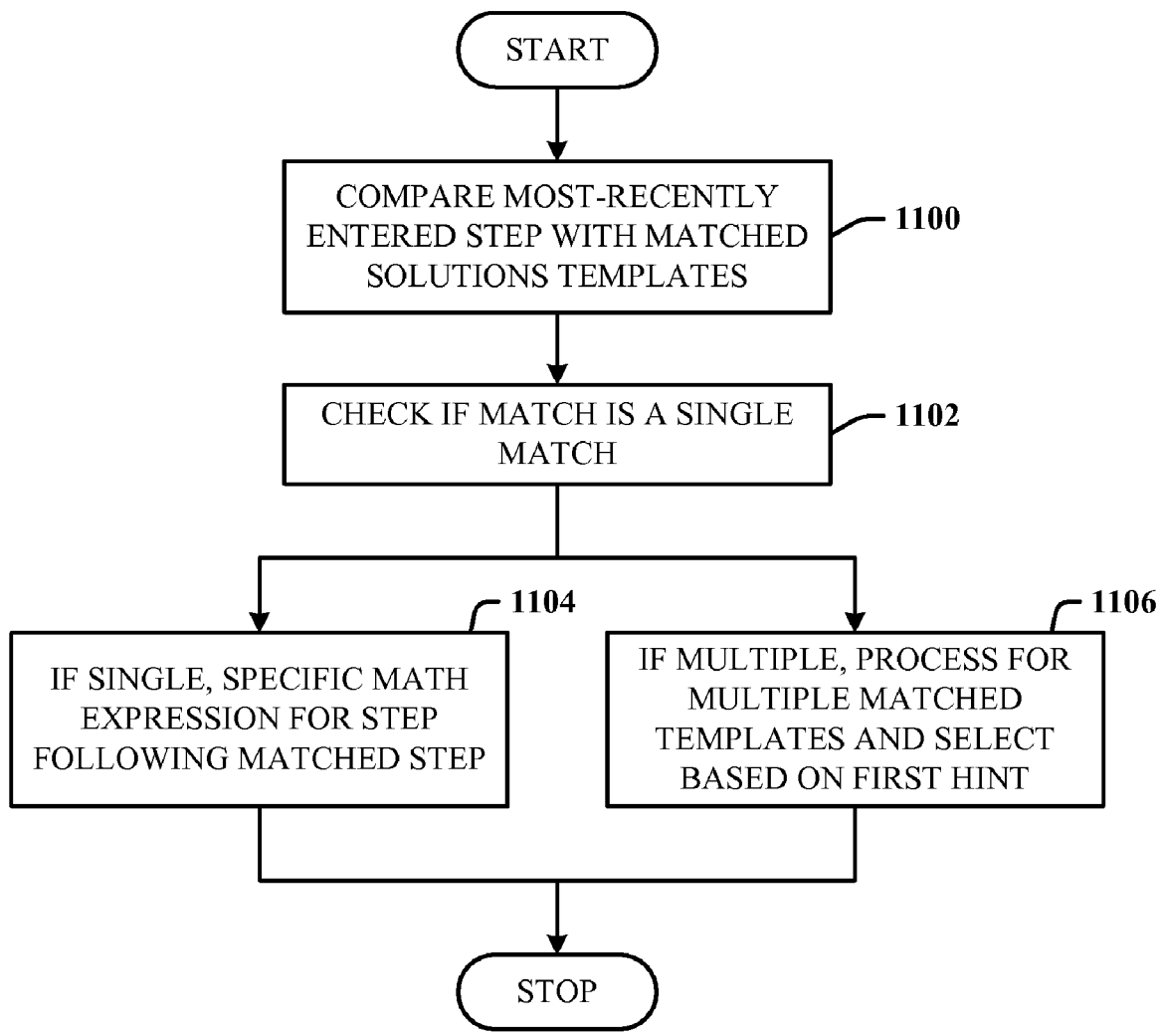
FIG. 11 illustrates a method of processing a third hint request.

FIG. 11 illustrates a method of processing a third hint request. At 1100, a most-recently entered step is compared with steps from all matched solutions templates (e.g., step-by-step templates). At 1102, a check is made to determine if the match is only a single template. If so, at 1104, the specific mathematical expression for the step following the matched step is presented. If not, steps for multiple templates are matched, and the solution method chosen is based on the first hint used, as indicated at 1106.

Figure 12:
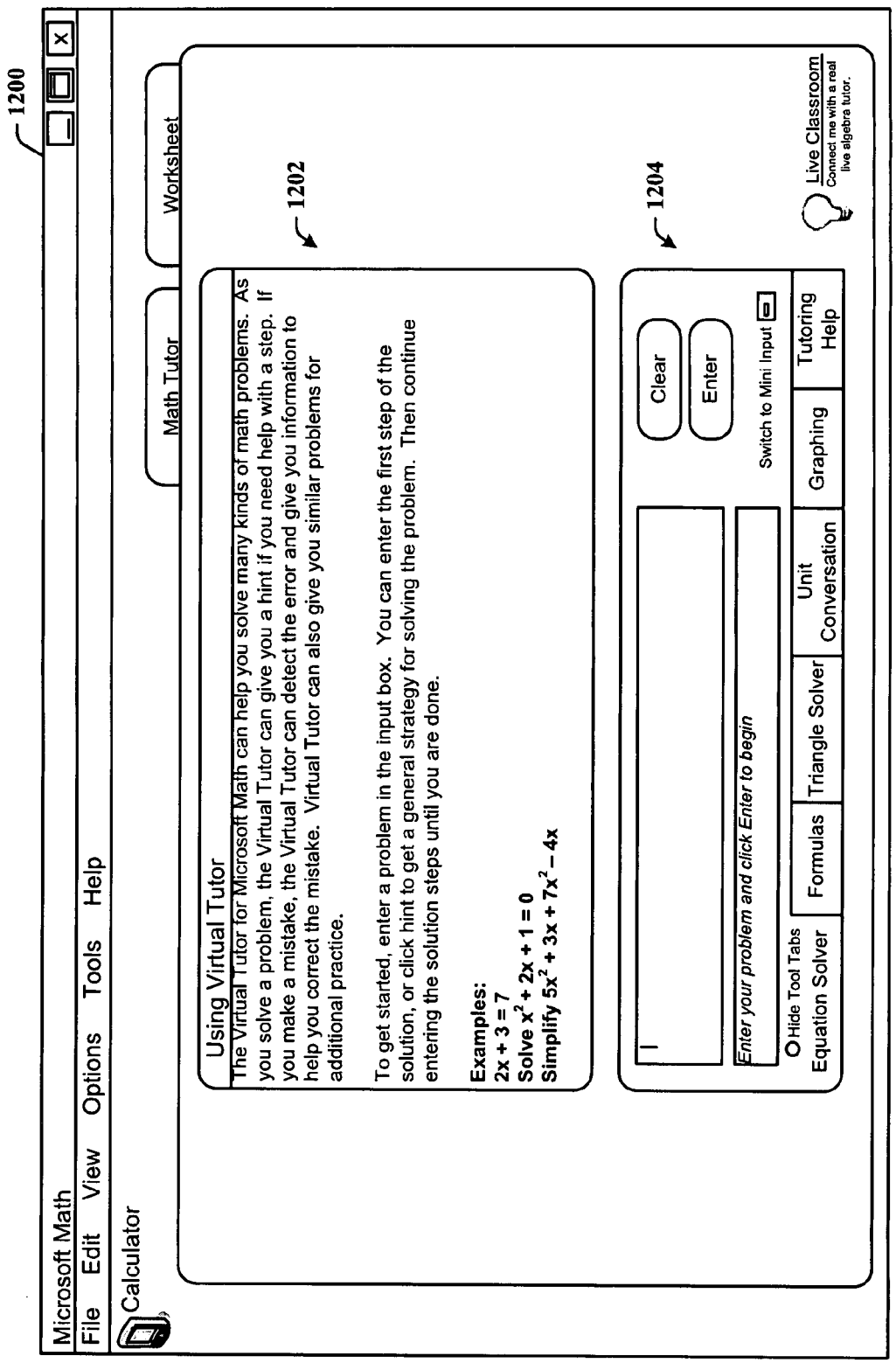
FIG. 12 illustrates a screenshot of an exemplary user interface for entering a math problem and receiving assistant for solving the problem.

FIG. 12 illustrates a screenshot 1200 of an exemplary user interface for entering a math problem and receiving assistant for solving the problem. The screenshot 1200 presents instructions 1202 to a user for getting started in using a virtual tutor program that utilizes the disclosed problem checker architecture. The screenshot 1200 also shows an input box 1204 into which the user enters a math problem to be solved.

Figure 13:
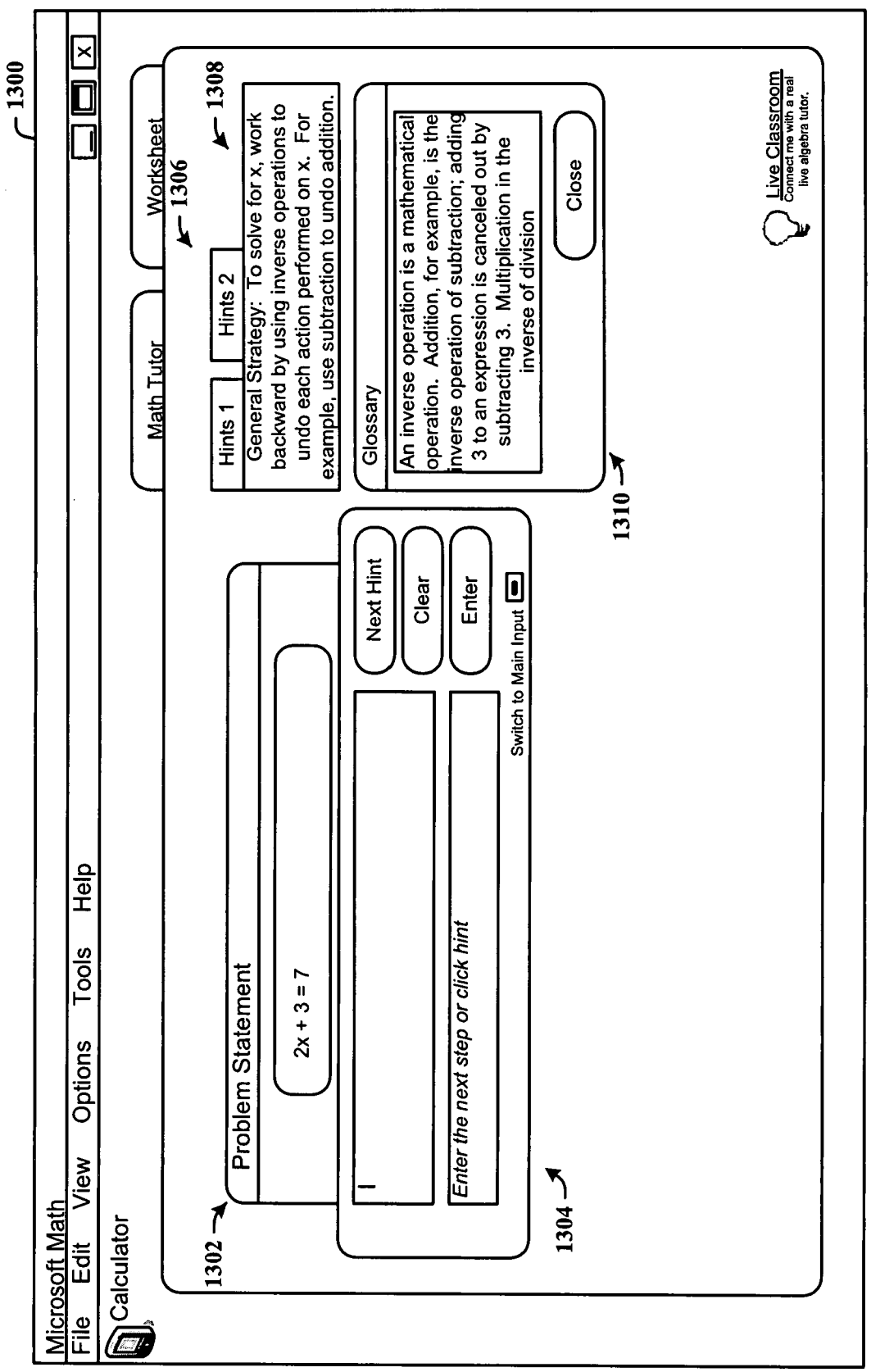
FIG. 13 illustrates a screenshot of an exemplary user interface for working a math problem and receiving hints and glossary information for solving the problem.

FIG. 13 illustrates a screenshot 1300 of an exemplary user interface for working a math problem and receiving hints and glossary information for solving the problem. The screenshot 1300 presents a problem statement window 1302 of the math problem to be solved and an input window 1304 for receiving the user's next step instructions using a virtual tutor program that utilizes the disclosed problem checker architecture. The screenshot 1300 also shows hints tabs 1306 for selection by the user, hotlinks 1308 as part of a strategy assistance block for additional information and a glossary panel 1310 for presenting the definitional text for the hotlinked text.

Figure 14:
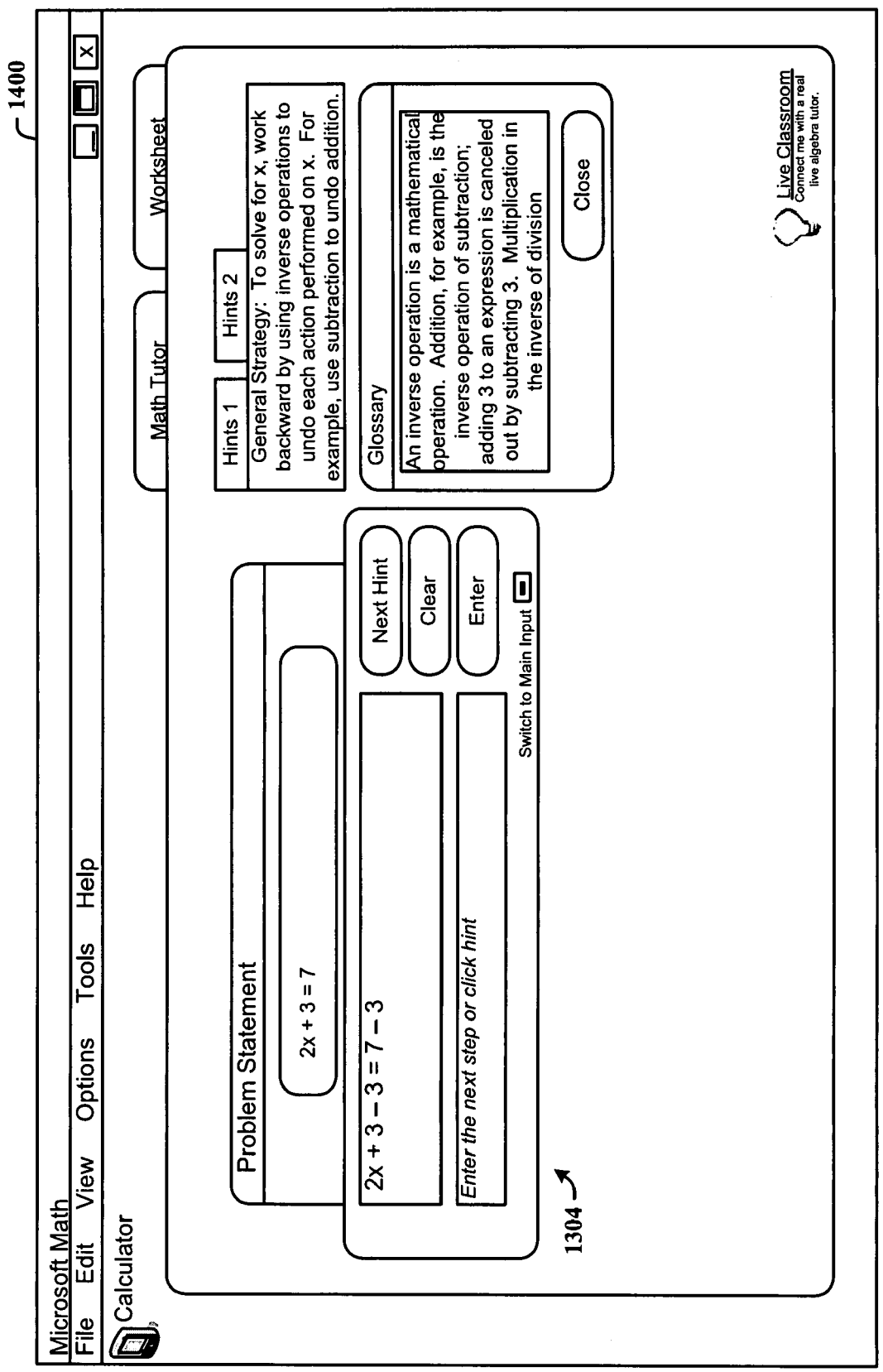
FIG. 14 illustrates a screenshot of an exemplary user interface for receiving user input during a math solving process.

FIG. 14 illustrates a screenshot 1400 of an exemplary user interface for receiving user input during a math solving process. The screenshot 1400 shows the input window 1304 for receiving the user's input for solving the problem.

Figure 15:
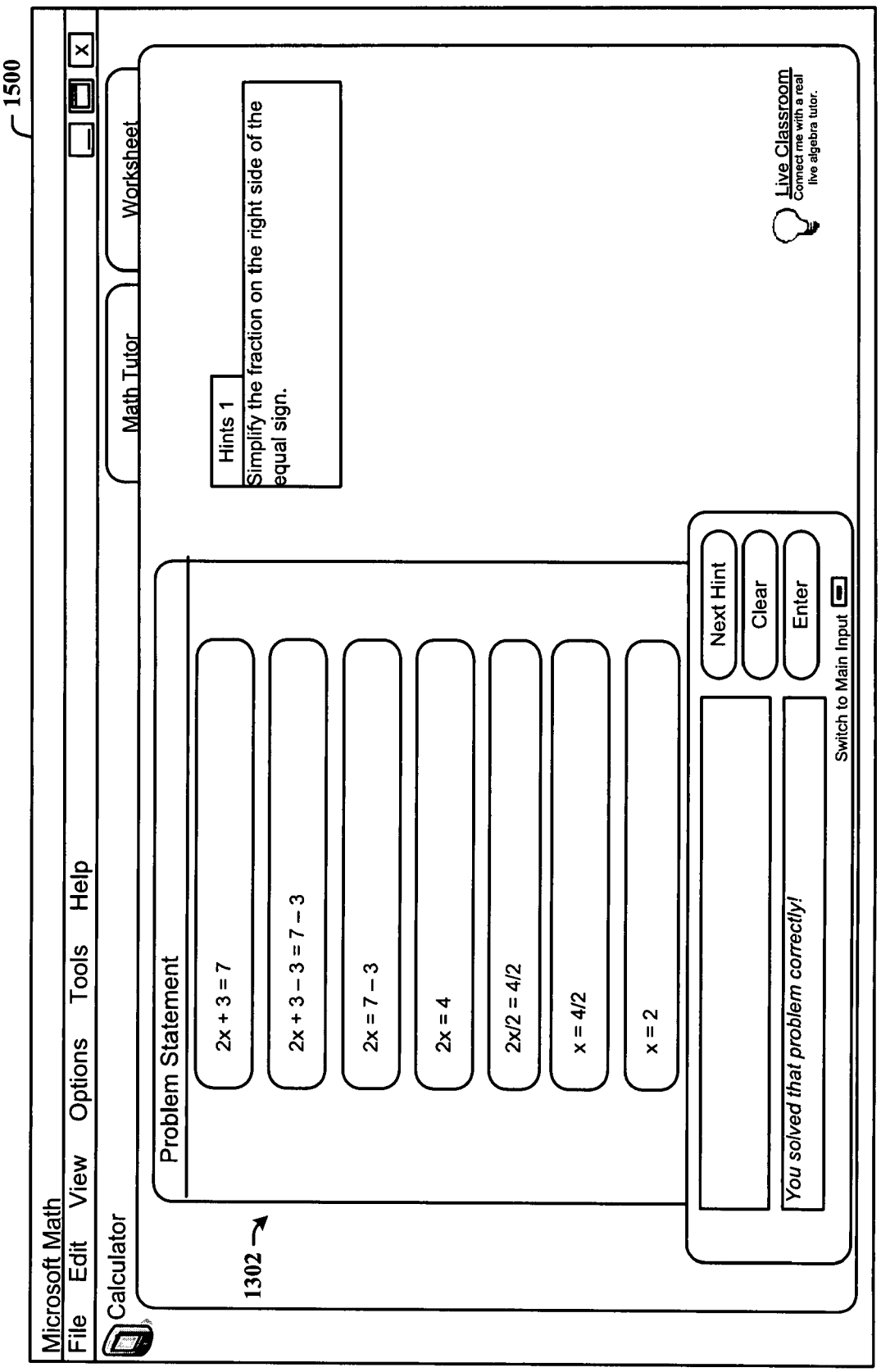
FIG. 15 illustrates a screenshot of an exemplary user interface for presenting the step taken by a user in a math solving process.

FIG. 15 illustrates a screenshot 1500 of an exemplary user interface for presenting the step taken by a user in a math solving process. The screenshot 1500 shows the steps taken by the user in the problem statement window 1302.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 16:
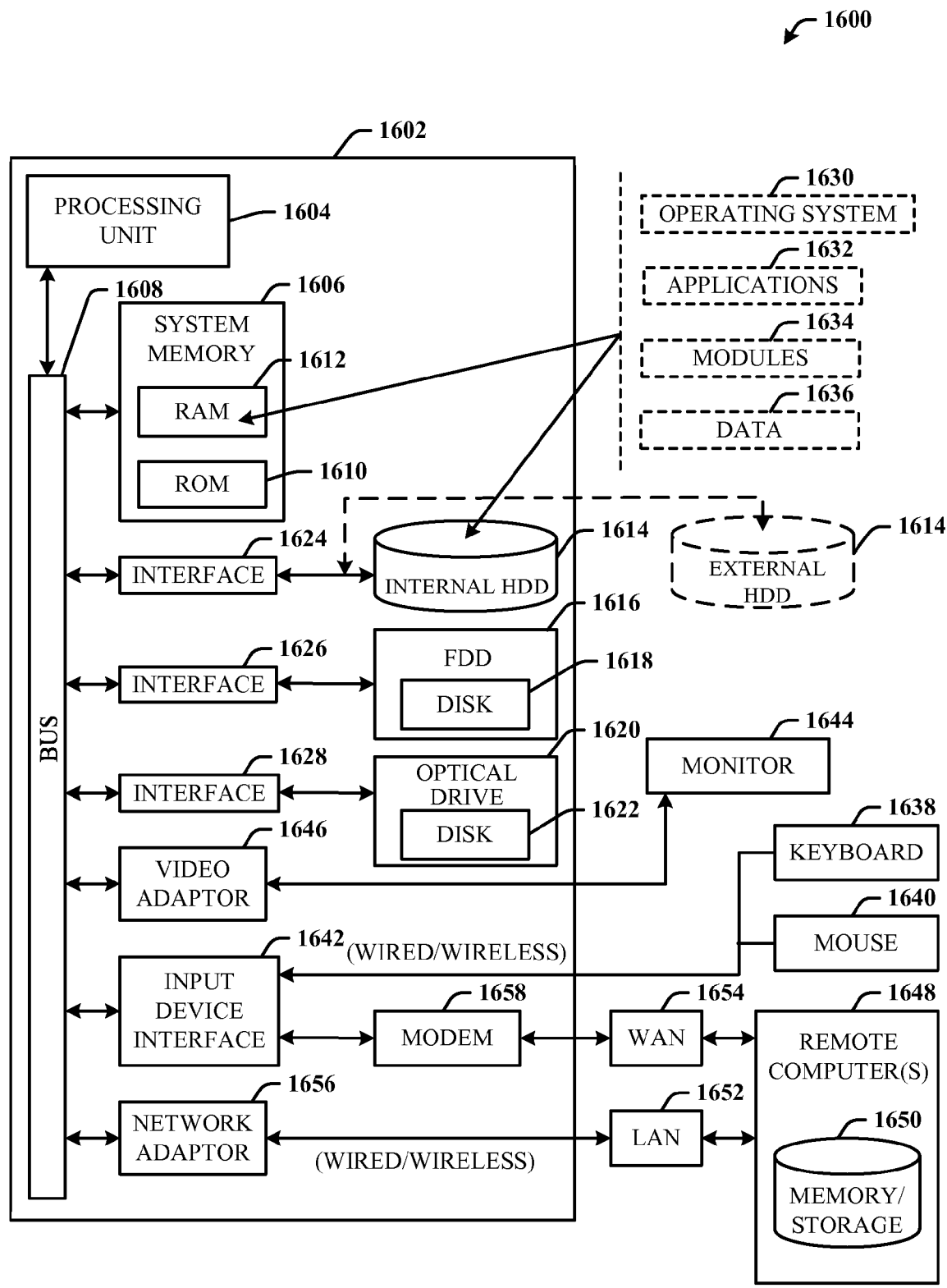
FIG. 16 illustrates a block diagram of a computing system operable to execute the disclosed problem checking architecture.

Referring now to FIG. 16, there is illustrated a block diagram of a computing system 1600 operable to execute the disclosed problem checking architecture. In order to provide additional context for various aspects thereof, FIG. 16 and the following discussion are intended to provide a brief, general description of a suitable computing system 1600 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 16, the exemplary computing system 1600 for implementing various aspects includes a computer 1602, the computer 1602 including a processing unit 1604, a system memory 1606 and a system bus 1608. The system bus 1608 provides an interface for system components including, but not limited to, the system memory 1606 to the processing unit 1604. The processing unit 1604 can be any of various commercially available processors. Dual microprocessors and other multi-processor architectures may also be employed as the processing unit 1604.

The system bus 1608 can be any of several types of bus structure that may further interconnect to a memory bus (with or without a memory controller), a peripheral bus, and a local bus using any of a variety of commercially available bus architectures. The system memory 1606 includes read-only memory (ROM) 1610 and random access memory (RAM) 1612. A basic input/output system (BIOS) is stored in a non-volatile memory 1610 such as ROM, EPROM, EEPROM, which BIOS contains the basic routines that help to transfer information between elements within the computer 1602, such as during start-up. The RAM 1612 can also include a high-speed RAM such as static RAM for caching data.

The computer 1602 further includes an internal hard disk drive (HDD) 1614 (e.g., EIDE, SATA), which internal hard disk drive 1614 may also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1612, including an operating system 1630, one or more application programs 1632, other program modules 1634 and program data 1636. The one or more application programs 1632, other program modules 1634 and program data 1636 can include the input component 102, problem checker component 104, UI 202, context-sensitive information 204, problem analyzer 206, solutions library 208, interface 302, datasource 306, external sources of information 304, and MLR component 402, for example.

All or portions of the operating system, applications, modules, and/or data can also be cached in the RAM 1612. It is to be appreciated that the disclosed architecture can be implemented with various commercially available operating systems or combinations of operating systems.

A user can enter commands and information into the computer 1602 through one or more wire/wireless input devices, for example, a keyboard 1638 and a pointing device, such as a mouse 1640. Other input devices (not shown) may include a microphone, an IR remote control, a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 1394 serial port, a game port, a USB port, an IR interface, etc.

A monitor 1644 or other type of display device is also connected to the system bus 1608 via an interface, such as a video adapter 1646. In addition to the monitor 1644, a computer typically includes other peripheral output devices (not shown), such as speakers, printers, etc.

The computer 1602 may operate in a networked environment using logical connections via wire and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wire/wireless connectivity to a local area network (LAN) 1652 and/or larger networks, for example, a wide area network (WAN) 1654. Such LAN and WAN networking environments are commonplace in offices and companies, and facilitate enterprise-wide computer networks, such as intranets, all of which may connect to a global communications network, for example, the Internet.

When used in a LAN networking environment, the computer 1602 is connected to the local network 1652 through a wire and/or wireless communication network interface or adapter 1656. The adaptor 1656 may facilitate wire or wireless communication to the LAN 1652, which may also include a wireless access point disposed thereon for communicating with the wireless adaptor 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wire and/or wireless device, is connected to the system bus 1608 via the serial port interface 1642. In a networked environment, program modules depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 17:
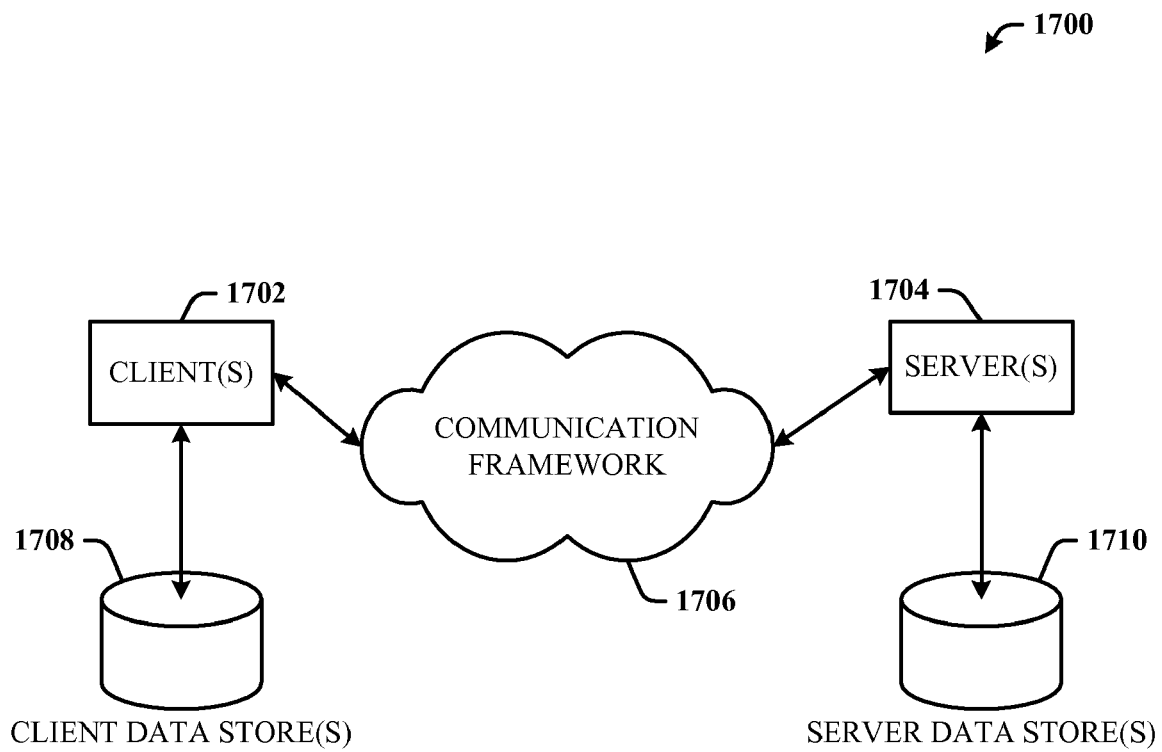
FIG. 17 illustrates a schematic block diagram of an exemplary computing environment for problem checking.

Referring now to FIG. 17, there is illustrated a schematic block diagram of an exemplary computing environment 1700 for problem checking. The system 1700 includes one or more client(s) 1702. The client(s) 1702 can be hardware and/or software (e.g., threads, processes, computing devices). The client(s) 1702 can house cookie(s) and/or associated contextual information, for example.

The system 1700 also includes one or more server(s) 1704. The server(s) 1704 can also be hardware and/or software (e.g., threads, processes, computing devices). The servers 1704 can house threads to perform transformations by employing the architecture, for example. One possible communication between a client 1702 and a server 1704 can be in the form of a data packet adapted to be transmitted between two or more computer processes. The data packet may include a cookie and/or associated contextual information, for example. The system 1700 includes a communication framework 1706 (e.g., a global communication network such as the Internet) that can be employed to facilitate communications between the client(s) 1702 and the server(s) 1704.

Communications can be facilitated via a wire (including optical fiber) and/or wireless technology. The client(s) 1702 are operatively connected to one or more client data store(s) 1708 that can be employed to store information local to the client(s) 1702 (e.g., cookie(s) and/or associated contextual information). Similarly, the server(s) 1704 are operatively connected to one or more server data store(s) 1710 that can be employed to store information local to the servers 1704.

The clients 1702 can include the system 100, the system 200, the peer client 308, and the system 400. The servers 1704 can include the external sources of information 304 and session server 308.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented problem checking system, comprising:
    an input component for receiving a math problem to be worked via a solving process; and
    a problem checker for monitoring the process and generating context-sensitive information as part of the solving process.

2. The system of claim 1, wherein the context-sensitive information includes at least one of hint information, correction information, or a solution generated in response to a user action during the solving process.

3. The system of claim 1, wherein the problem checker presents the context-sensitive information based on a request by the user.

4. The system of claim 1, wherein the problem checker presents the context-sensitive information to a user based on an error detected during the solving process.

5. The system of claim 1, wherein the problem checker presents hint information to a user as part of the solving process.

6. The system of claim 1, wherein the problem checker computes multiple possible solutions to solving the math problem.

7. The system of claim 1, further comprising a machine learning and reasoning component that employs a probabilistic and/or statistical-based analysis to prognose or infer an action to be automatically performed.

8. The system of claim 1, further comprising a problem analyzer for analyzing the math problem for math equivalency with a predetermined math expression of a math expression template.

9. The system of claim 1, further comprising a user interface for presenting the math problem, the context-sensitive information, and user-selectable math symbols.

10. A computer-implemented problem checking method, comprising:
    receiving a math problem to be solved;
    computing one or more solutions to the problem;
    receiving user input for solving the problem during a solving process; and
    offering solutions information in response to the user input.

11. The method of claim 10, wherein the solutions information includes hints information offered at a step of the solving process.

12. The method of claim 10, further comprising retrieving problem-related information from at least one of an internal datasource or an external datasource.

13. The method of claim 10, further comprising comparing the one or more solutions against solutions templates and generating error messages based on an outcome of the comparison.

14. The method of claim 10, further comprising offering the solutions information for a step of the solving process in the form of a hint string based on previous comparison results between solutions templates and the user input.

15. The method of claim 14, further comprising presenting solution methods associated with steps of the solving process that match solutions templates.

16. The method of claim 10, further comprising offering the solutions information for a step of the solving process in the form of an instruction string based on previous comparison results between solutions templates and the user input.

17. The method of claim 16, further comprising presenting a solution method associated with hints information of a previous step of the solving process where the user input matched a solution template.

18. The method of claim 10, further comprising inferring an action to be automatically performed based on at least one of probabilistic analysis or statistical analysis of one of the math problem, the user input or profile information.

19. The method of claim 10, further comprising presenting a specific math expression for a next step of the solving process based on user progress with an existing step.

20. A computer-implemented system, comprising:
   computer-implemented means for receiving a math problem to be solved;
   computer-implemented means for computing one or more solutions to the problem;
   computer-implemented means for receiving user input for solving the problem during a solving process; and
   computer-implemented means for offering solutions information in response to the user input.

* * * * *